2 Sheets—Sheet 1.

W. E. PRALL.

Assignor, by mesne assignments, to the NATIONAL HEATING COMPANY.

MEANS FOR SUPPLYING HEAT AND STEAM OR WATER POWER TO CITIES, TOWNS, &c.

No. 10,923. Reissued Apr. 17, 1888.

Witnesses.
Jas R. Steward.
Frank W. Shaw

Inventor,
Wm E. Prall,
By his Attorney.
H. H. Lanfield

2 Sheets—Sheet 2.
W. E. PRALL.
Assignor, by mesne assignments, to the NATIONAL HEATING COMPANY.
MEANS FOR SUPPLYING HEAT AND STEAM OR WATER POWER TO CITIES, TOWNS, &c.
No. 10,923. Reissued Apr. 17, 1888.
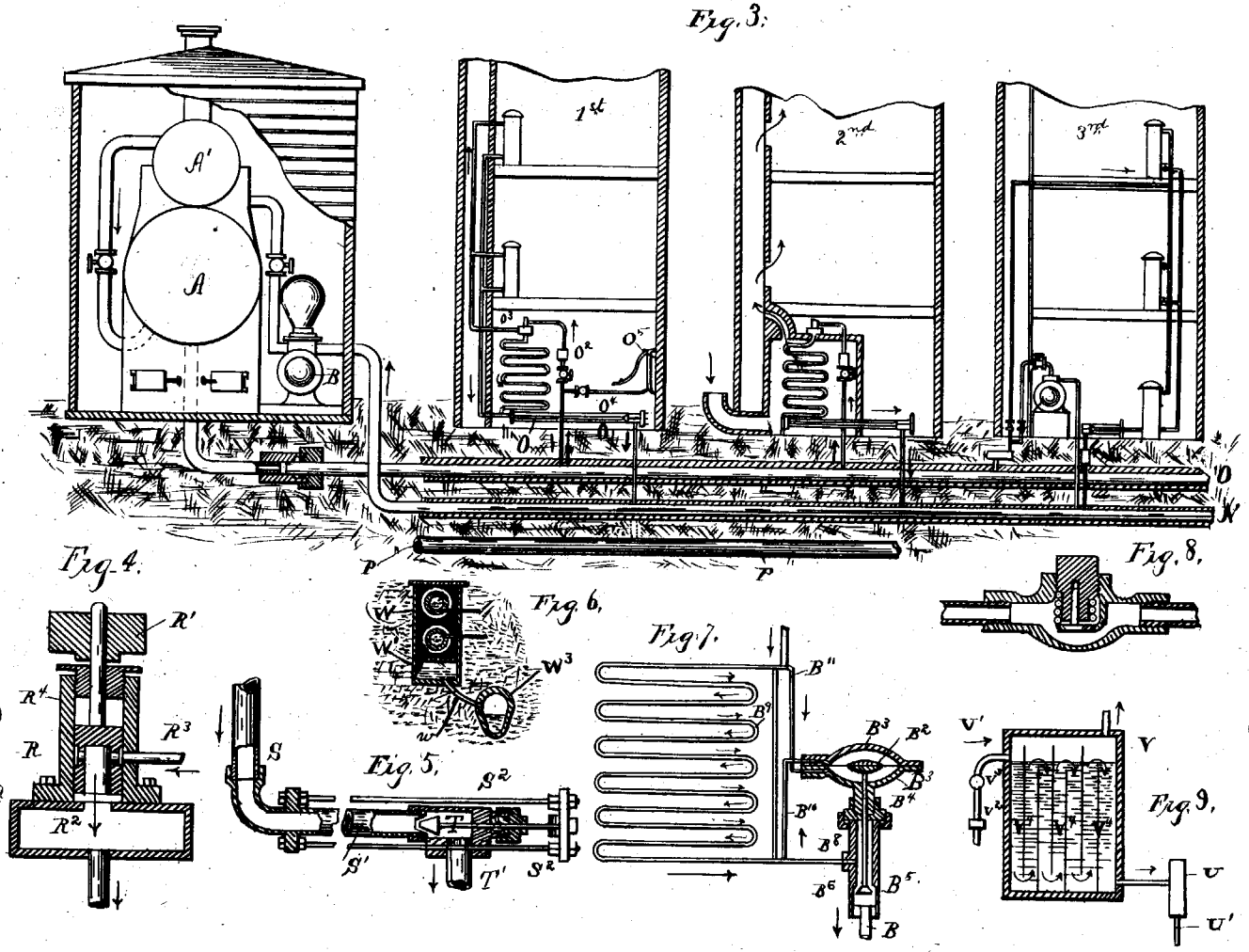
Witnesses.
Ira R. Steward.
Frank W. Shear
Inventor.
Wm E. Prall.
By his Attorney
W. H. Canfield

UNITED STATES PATENT OFFICE.

WILLIAM E. PRALL, OF WASHINGTON, DISTRICT OF COLUMBIA, ASSIGNOR, BY MESNE ASSIGNMENTS, TO THE NATIONAL HEATING COMPANY, OF NEW YORK, N. Y.

MEANS FOR SUPPLYING HEAT AND STEAM OR WATER POWER TO CITIES, TOWNS, &c.

SPECIFICATION forming part of Reissued Letters Patent No. 10,923, dated April 17, 1888.

Original No. 379,283, dated March 13, 1888. Application for reissue filed March 27, 1888. Serial No. 268,726. Patented in England July 23, 1879, No. 2,987, and in Germany January 27, 1880, No. 13,525.

*To all whom it may concern:*

Be it known that I, WILLIAM E. PRALL, a citizen of the United States, and a resident of Washington, in the District of Columbia, have invented certain new and useful Improved Means for Supplying Heat and Steam or Water Power to Large Districts of Buildings in Cities and Towns, (for which I have obtained a patent in Great Britain, No. 2,987, dated July 23, 1879; also in Germany, No. 13,525, dated January 27, 1880,) of which the following is a specification.

This invention relates to a novel means of conveying heat for the purpose of warming large districts of buildings in cities and towns and to the manner of utilizing and distributing the same from one common source of supply, and embodies a safe, economical, convenient, and healthful system of delivering and controlling the heat in each and every building and compartment therein, and of supplying motive power for propelling street cars, stationary engines, and for other purposes.

Figure 1:
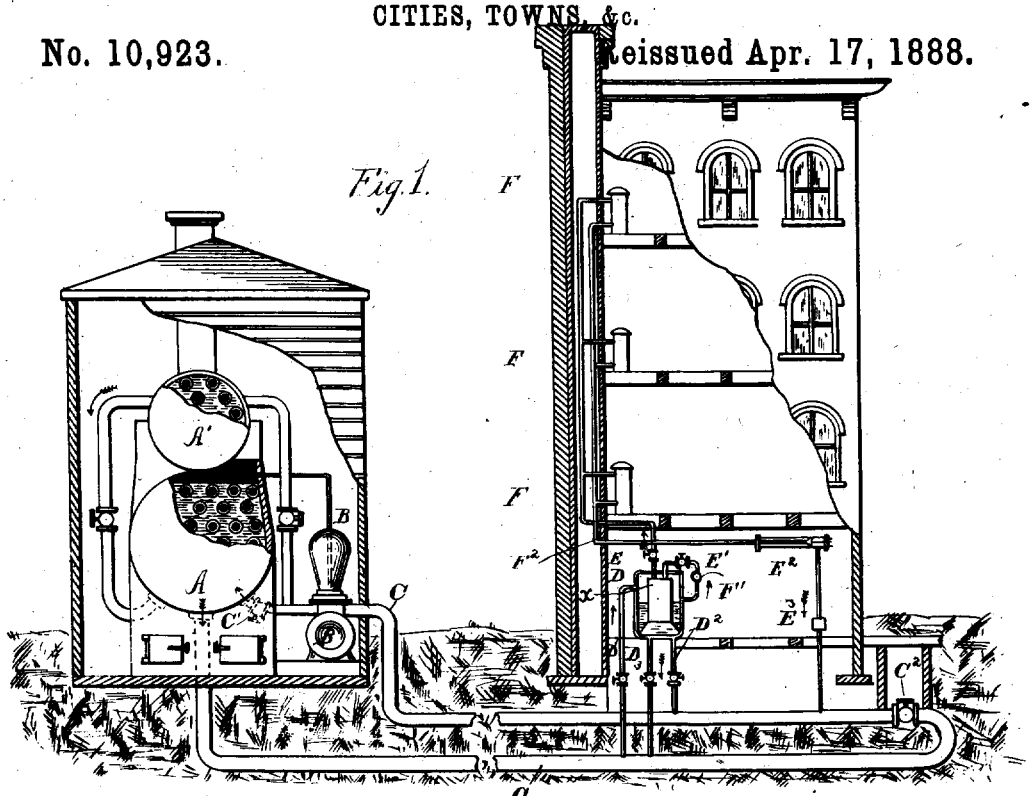
Figure 2:
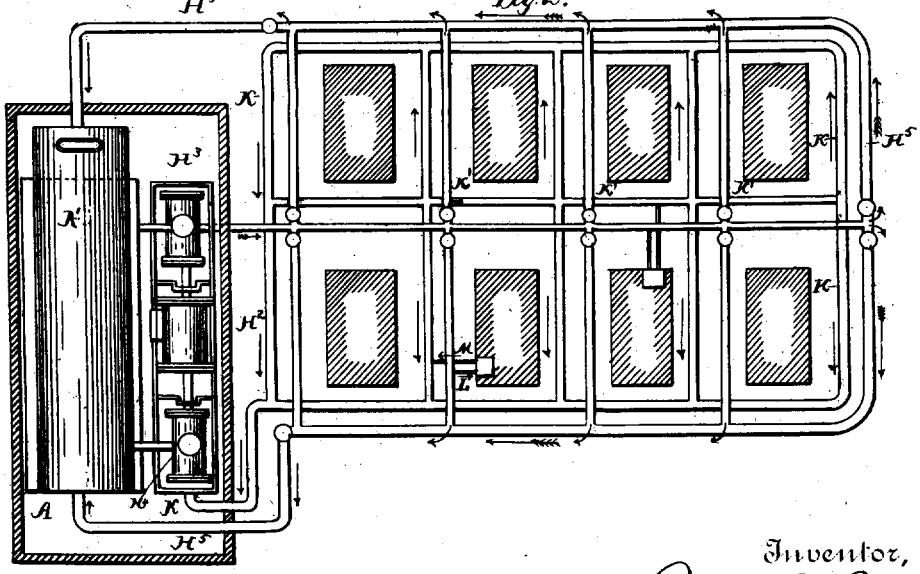

Figure 1 is a part-sectional view of a heating tank or boiler and preheater or water-heater, also of a hot-water-circulating main and a building fitted up with radiators connected with an apparatus for converting the hot water when taken from the main pipe into steam, and traps for returning the water of condensation to the circulating-main. Fig. 2 shows a plan view of the heaters and circulating-pumps, together with a view of the pipes conveying hot water through different streets and pipes for returning the water of condensation, and a pump for forcing the same into a preheater, and thence directly into the heater from which it was previously taken. Fig. 3 shows three modifications of the apparatus for taking the hot water from the main and utilizing the same for heating buildings, as well as arrangements for metering the same. Figs. 4, 5, 6, 7, 8, and 9 are detail drawings of a pressure-regulating valve, temperature and balance valve for controlling the exhaust-water from the radiators, and means for draining the circulating-pipes, and an apparatus for measuring steam.

In Fig. 1, A represents a hot-water tank or heater, and should be of sufficient capacity to furnish all the hot water that would be required for supplying heat to the district reached by the circulation pipe or main C, said pipe being connected thereto at or near the bottom, certainly below the water-line. The heater is provided with a constant supply of water by means of a pumping-engine from any convenient source, in such quantities as are needed to keep up the waste from the main pipe, which may be drawn from it for any purpose whatever. The power for driving the pumping-engine may be taken from the steam generated in the water-heater, or it may be taken from any other boiler erected for that purpose.

It is evident that there may be several of the water-heaters employed for the purpose of supplying water for circulation, and they may all be connected, or they may be separated by means of cocks placed in the connecting-pipes, so that one or more of them may be used independent of the others.

In the practical operation of this invention the water-heaters should be located in a suitable building convenient to the district to be supplied with heat, and the circulating-pipe C connected with the force-pump B, said pump being also connected with C′, which is, in fact, the same from its connection with the heater A, extending through the force or circulating-pump B, and from thence through one street and returning through another, as represented, and terminating again in the heater, the purpose of the force-pump B being only that of circulating the hot water, taking it from the heater under pressure, and returning it again for the purpose of reheating, and the pump will be kept operating with sufficient rapidity to cause the flow of water to be rapid enough to convey heat without much reduction of temperature along the entire length of the pipe.

Other means may be employed to circulate the water through the pipes—as, for instance, the two ends may be connected with different heaters having a different pressure, and thus the hot water may be forced from the one having the greater pressure through the pipe connecting it with the heater of less pressure.

It is evident that various means may be employed for circulating water; hence I do not confine myself to any particular manner, and in some places where the amount drawn from the pipe was sufficiently great the flow might be enough to keep the temperature high at the farthest end without the necessity of returning it to the heater, and in that case no return-pipe or force-pump would be required; but the evident advantage of circulating the water is so apparent as to make the adoption of a single pipe only a possibility.

The street-main is to be covered with some non-conducting substance to prevent as much as possible, the radiation of the heat therefrom, and is also provided with expansion and contraction joints to allow for the movement of the main pipe longitudinally. The manifold advantages of thus conveying heat great distances will be easily comprehended, because as the weight or body of a cubic foot of water (or any given quantity) is at the boiling or steam-generating point seventeen hundred (1,700) times as great as the steam thrown off at that temperature, it follows that it contains a far greater number of units of heat. Thus it will be seen that a much larger amount of heat may be delivered through a pipe a great distance without loss from condensation than could be effected by means of steam, and the hot water may by this process be converted into steam or otherwise used for the purpose of heating buildings at the point where required and overcome the great difficulty which has heretofore prevented the heating of buildings located at a distance from the generator, at the same time affording a much more convenient and economical means of heating than by separate fires and generators located in each building, and also avoiding much risk from danger by fire.

In Fig. 1, A represents a hot-water tank or heater, which should be of sufficient capacity to furnish all the hot water that would be required for supplying heat to the district reached by the circulating pipe or main C, said pipe being connected thereto at or near the bottom, either directly or indirectly, *via* the preheater A′, as shown by the pipe-connections and the arrows. B represents a circulating-pump, which is connected with the pipe C at some point between the connections of the two ends of the same with the heater A, the purpose of which is to cause the hot water to move through the said pipe and be returned to the heater again, and it may be placed at either end of the circulating-pipe. The power for running it may be derived from any source whatever. The pump B may be placed in the pipe connecting the preheating-tank with the main heater, and as it would take the water from the preheater the hot water would be forced from the heater of greater pressure through the circulating-pipes into the preheater or heater of less pressure, and thus circulation would be maintained in the pipe, which pipe may extend for a considerable distance on the street and return again to the heater. I have shown in this figure one manner of conveying the hot water to a building and utilizing the same for heating purposes. In the illustration, D represents a tank connected with the hot-water pipe C by means of branch pipes D′ and $D^2$, said pipes being arranged to unite the tank D with the circulating pipe C at the same point, either very near together, as shown by pipes D′ and $D^3$, or a greater distance apart, by attaching one to the outflowing end of the pipe C and the other to the inflowing end of the same, as shown by pipes D′ and $D^2$. X represents another tank placed within the tank D, leaving a space between the two. F′ is the pressure-regulating valve in the pipe connecting the tanks D and X. E is a pipe connecting with the interior tank, X, and extends to the radiators F in the different parts of the house. $F^2$ is the condensed-water pipe, extending from the bottom of the radiators to the discharge-valve $E^2$, and thence to the circulating-pipe C. $E^3$ represents a meter of any kind connected with the discharge $F^2$. $C^2$ represents a cock or valve, which may be used to increase or diminish the size of the pipe C, for the purpose of controlling the pressure and the rapidity of the circulation in said pipe. If the heater A be now filled with water and by means of the fire in the furnace is heated to a high degree—for example, say 332° Fahrenheit, which would give a pressure of about one hundred pounds to the square inch, and be kept at that point, which would be one hundred and twenty degrees above the steam generating point—and if the connections at both ends of the circulating water-mains be opened, the pressure upon them and the water therein will be the same as upon the water in the heater and preheater, and if the force-pump be put in motion it will cause the water to be forced through the pipe by taking it from the heater and by discharging it again into the same through the return-pipe and through the preheater. The result will be to soon establish a temperature of about the same degree to the water in the main pipe its entire length as that in the heater. If, now, the cocks in the pipes D′ and $D^2$ be opened, the hot water under pressure will flow from the main pipe C into the outside tank, D, and surround the inner tank, X, and if the regulating-valve F′ be constructed to establish a ratio of difference in pressure that may be desirable the water from between the tanks D and X will flow into X through the valve and connecting-pipe F′; but as soon as a small quantity has entered the tank X the reduction of pressure established by the differential valve will cause the hot water so admitted to be converted into steam, as it contains many degrees of heat above the steam generating point, as before mentioned. As soon as the quantity of water thus admitted, however, has been evaporated into steam the space in the tank X will be filled under pressure, which will act upon the differential valve F′ and close it and prevent the further admission of hot water. The steam from tank X will force its way through pipe E into the different radiators connected thereto and heat the same; but the cold air surrounding them conveys away the heat, and the steam therein will be condensed, and thus the amount of water admitted into tank X will be converted into steam and conducted to the radiators. The condensed water, therefore, will be conducted through the pipe $F^2$ and the temperature discharge-valve $E^2$ to the meter $E^3$, and thence to the pipe C again. As soon as condensation has reduced the steam-pressure sufficiently in tank X and connecting-pipes and radiators, more hot water will be admitted through the differential valve F′ into tank X, and thus the supply will be kept constant. The hot water admitted into tank X will not be converted into steam by means of its own specific heat, and hence the purpose of surrounding the converting-chamber X with the hot water in tank D, the heat of which will cause all the water admitted into tank X to be evaporated. The purpose of connecting pipes D′ and $D^2$ is to unite tank D with the main pipe C, and thus produce circulation, for it will be seen that as the water in said tank transmits its heat into the water which is admitted into the interior tank, X, its temperature thereby will be proportionately lowered, and hence heavier, and circulation will thus be established between the hot-water pipe C and the tank D through pipes D′ and $D^2$, and by means of this circulation a temperature will be maintained in said tank nearly the same as in the pipe C. If the cock in the circulating pipe C be partially closed and the pump B is kept in operation with sufficient rapidity to remove the water from the end of pipe C faster than it is permitted to flow through the contracted opening in the pipe at the cock $C^4$, the result would be to make the pressure less in the return end of the circulating-pipe C, and thus increase the rapidity of circulation through the pipes D′ and $D^2$, as well as from the condense-water pipe; or if the circulating-pump is placed at the outflowing end of the circulating-pipe C the effect would be to increase the pressure in that end above that of the inflowing end, which would have the same effect to increase the circulation through the branch pipes connected thereto.

The manner of utilizing to the best possible advantage all the heat in the coal in preheating the water before it is admitted into the main heater is accomplished, as shown in Fig. 1, by placing the preheater above the main heater in such a manner that the heat will pass through the preheater after passing through the main heater. In this manner all the water from the return-pipe, which is of a lower temperature than that in the heater A, will be caused to pass through the preheater.

In Fig. 2 I have shown a plan for circulating hot water around several blocks of buildings and means for controlling the flow in each and every section, and also a system of return-pipes connected with the main hot-water pipes by the connecting-pipes from the radiators, and connections between the hot-water or supply pipes and the return-pipes may be made at the connections K′ at the junction of the streets, if desired. I have also shown in this figure a double-cylindered pump—one used for circulating the hot water and the other for taking the return-water from the pipes and forcing it into the heater or preheater. In this figure, $H^5$ designates the supply-pipe and K the return-pipe, and the circulation is as indicated by the arrows. It is evident that by means of cocks or valves at the connections K′ the circulation in any of the cross-pipes may be cut off or controlled. L is the pipe which connects the supply-pipe of the street with the building, and M the pipe which returns the water to the return-pipe of the street, by which it is reconveyed to the heater. It is evident that very little water would be wasted from the pipes, except that drawn off for domestic purposes, as all the condensed water would be returned for reheating, and the amount so drawn from the pipes the pump $H^4$ will supply from any convenient source. It is evident that a force-pump may be employed to cause circulation in the return-pipe, and that the pump B may be placed at either end of the supply-pipe.

In Fig. 3 I have shown several other modes of arranging the pipes and connections for conveying the hot water from the mains to the radiators and for returning the same after the heat has been extracted and utilized in warming buildings and propelling engines, &c., and means for preventing the radiation of heat from the pipes. In this figure, A represents the heating-tank, B the circulating-pump, and O N the hot-water main and return-water main; P, the drain-pipe. In this building—the first building—water is admitted from the main through the pipe O′ into the regulating-valve $O^3$. The steam thrown off by the reduction of pressure by means of this valve is conveyed to the radiators connected thereto by means of pipes. The water admitted to the evaporator through the regulating-valve, which is not converted into steam, is conveyed through the hot-water coil connected therewith, and thence through the discharge valve or trap $O^4$ into the return-pipe N, which may be one continuous circulating-main, as shown in Fig. 1, or it may be a separate pipe connected with the supply-main only by means of the branch pipes, as shown in Fig. 2, these branch pipes being also connected with the radiators, and the return-water may be taken therefrom by the suction-pump and forced into the preheater, and thence into the main heater, as shown in Fig. 2. The meter $O^2$ will register the amount of water forced through the pipe O′, and as the trap $O^4$ is made to prevent the discharge of the condensed water only after it has had its temperature reduced to a certain degree it becomes an easy matter of calculation to determine the amount of heat consumed. I have also shown in this figure means for extinguishing fires in buildings provided with this system, which consists of a suitable hose or flexible pipe, $O^5$, which is connected with the supply-pipe, as shown, and at all times when the system is in operation any fire within reach of the hose may be easily extinguished. In the second building of this figure the apparatus is the same, except the air conveyed into the rooms is admitted to the cabinet containing the coil, and after being heated is delivered through the flues extending therefrom into the various apartments. In the third building of this figure is shown an arrangement of the pipes and radiators in a manner to utilize the hot water under full pressure. This plan has some advantages over the use of steam for heating purposes, in that it can be controlled by means of cocks or valves in such a manner as to keep the temperature of the radiators at any desired degree, while with steam it must either be at its full heat or entirely cut off. All who have used steam have been inconvenienced by this lack of control of the heat. Then, again, the noise occasioned by the condensation of steam is entirely avoided when hot water is used directly in radiators. I have also shown in this figure an engine which can be run for power directly with hot water, and by exhausting into the return-pipe be quite as economical and operative as when run by steam, as all condensed water will be conveyed back to the heater. There is no difficulty in working water at a high temperature in an engine properly constructed and arranged to exhaust in this manner, provided the cut-off is arranged to work very expansively and at a low pressure and finely wire-drawn or dissipated. The meter will determine the amount of water consumed, as in any other operation. In some of the illustrations I have shown the meter in position to measure the condensed water from the radiators. This plan, however, is not considered very practical as a means of determining with any degree of accuracy the amount of heat consumed, as the many accidental leaks, to say nothing of those purposely left in that condition, would easily allow of a very great discrepancy, as one cubic foot of condensed water would represent nearly a thousand cubic feet of steam; hence great opportunity would be afforded to practice imposition by means of the many cocks, valves, and joints in and about the house. The only accurate way when steam is used in a building is to meter the water first before it has entered any of the pipes and radiators connected therewith.

Fig. 4 represents a pressure-regulating valve. It is constructed by fitting a movable plug, R, into the cylinder or barrel $R^4$, the plug having a recess turned or cut in it about the center, which communicates by means of openings with the tank $R^2$, to which the case $R^4$ is fastened. The plug has a stem extending outward through the cap of the cylinder $R^4$, which carries a weight, R′. In the practical operation of this valve, the pressure-pipe $R^3$ being opened, the hot water is admitted from the main pipe through the branch pipe and meter connected therewith, as shown in the first and second buildings of Fig. 3. The communication being opened, the hot water will pass freely into the tank or converting-chamber $R^2$; but upon entering the said tank the pressure will be immediately relieved and steam will be generated, the pressure of which will act upon the plug R, and as soon as the pressure has exceeded that of the weight R′ the plug will be thrown up and the inlet-port from the pipe $R^3$ will be cut off and the further admission of hot water will be prevented; but as condensation is constantly going on in the radiators which connect with the converting-chamber $R^2$, the pressure will soon be so far reduced therein that the weight R′ will be greater than the sustaining force of the steam on the face of the plug R, and it will begin to descend again. This movement will expose the inlet-port and a further admission of hot water will be permitted, which will again be converted into steam, and in this manner a constant and nearly equal pressure will be maintained in the tank or converting-chamber $R^2$ and radiators connected therewith, irrespective of the pressure in the main or hot water pipe.

In Fig. 9 I have shown a detached view of an apparatus to be used in converting the hot water into steam for running engines, which is designed for use at such times and places where steam only is required for power. V. represents a converting-tank, into which the hot water is admitted directly from the main pipe V′ through the meter $V^2$ and reducing-valve $V^3$. Said converting-tank is constructed with partitions $V^4$, extending perpendicularly or otherwise in such a manner as to cause the water to pass through a considerable distance before it is finally discharged into the trap U and into the return-pipe U′, said partitions being of unequal height and left open at their tops for the escape of steam, as shown in the drawings, the object being to retain the water for a sufficient length of time to enable the steam which is evaporated by the specific heat of the water to be thrown off before the condensed water is discharged into the return-pipe, and in that manner to enable a near approximation of the amount of heat or steam consumed to be made, for it will be seen that if a given amount of water is admitted into the apparatus at a given temperature and discharged only after it has been reduced to a very much lower temperature nearly all the steam thrown off and used could be determined. In this apparatus the hot-water-induction port would be controlled by the governor of the engines, and in that way the power would be regulated. The trap shown in Fig. 7 would be the proper kind of thing to use with this apparatus, as it would carry away all the water as fast as it was allowed to pass through the converting-tank, but would not permit the escape of any steam, whereas an expansion or temperature trap could hardly be regulated so satisfactorily in such cases as where the water would be required to be discharged above the steam generating point as required for power purposes.

In Fig. 5 is shown one form of a temperature steam-trap. It consists of a long copper (or other soft material) tube, S′, which is arranged to convey the water of condensation from the radiators. There are two bars or rods, $S^2$, extending the full length of the tube S′, which are attached to the same base. These rods carry on their opposite ends a fixed valve, T, which communicates with the valve-seat constructed on the end of the expansion-tube S′. A discharge pipe, T′, is attached to the expansion tube to convey away the water which passes through the valve T. In the operation of this trap the water of condensation will pass into the tube S′, and will by its heat expand the same and cause it to close the opening or valve T; but as soon as it has become sufficiently cooled the contraction of the pipe or tube will permit the water to pass out. As soon as the water begins to run hot through the tube it will again expand and close the valve. By this means the water of condensation can be discharged at almost any temperature from the radiators, and thus the entire heat of the water admitted may be utilized in warming the building.

In Fig. 6 I have shown one manner of protecting the pipes underground from radiation by covering them by some well-known non-conductor and inclosing them in a wooden box, W, arranged with a space, W′, to carry off the water that otherwise might come in contact with the pipes and covering. The space or channel W′ is in communication with the street-sewer $W^3$ by means of a pipe, *w*.

In Fig. 7 I have shown a trap for discharging the water from the radiators. It is connected with the branch pipe B, leading to the street return-pipe. It is constructed by placing a movable diaphragm, $B^2$, between two concave cases, $B^3$, and then bolted together, thus holding the diaphragm firmly in its position. To this diaphragm is fastened a stem, $B^4$, carrying a valve, $B^5$, which opens and closes a port constructed in the barrel $B^6$, said barrel being rigidly attached to the lower side of the case $B^3$. The pipe B, which extends to the return-main, is connected below the valve, as shown. The barrel $B^6$ is also connected by means of a pipe, $B^8$, with the bottom of the radiator or drip-pipe $B^9$, this latter connection being made with the barrel above the discharge-valve. A pipe, $B^{10}$, extends from the drip-pipe to the upper side of the diaphragm-cases. There is also a pipe, $B^{11}$, extending from the lower side of the diaphragm-cases and connected to the upper end of the radiator or to a pipe extending upward from the drip-pipe. In the operation of this trap it should be placed at the position where the water of condensation will flow into it, and the pipes $B^{10}$ and $B^{11}$ arranged, as shown, to extend above and below the diaphragm, and when full of water said pipes will regulate the movements of the same, and thereby control the discharge-valve. It is evident that if the water should be drawn off from the radiators or from the connecting-pipe $B^9$ and the column of water in $B^{10}$ were retained by reason of the connections with the lower side of the case $B^3$ the pressure of the column upon the increased area of the diaphragm would cause it to move in an upward direction and carry with it the valve $B^5$, and thus prevent further discharge of water from the pipe $B^8$. So soon, however, as the accumulation of water in the pipe $B^8$ and connecting-pipe $B^9$ has brought about an equilibrium of pressure in the pipes $B^{10}$ and $B^{11}$, the diaphragm will drop by the weight connected thereto, and the valve $B^5$ will again be opened and the water permitted to flow out, and thus the operation will continue alternately.

In Fig. 8 I have shown one construction of a valve for regulating the pressure. In this system for conveying heat and power the pipes are to be provided with cocks or valves, as shown in Fig. 2, so that any section may be closed for repairs without interfering in any way with the constant supply, which can be furnished through other pipes connected thereto at the junctions of the streets. This system will not only furnish power for running all kinds of engines, elevators, and heat for warming buildings, but it may also be employed through the agency of a steam or hot-water stove for all kinds of cooking and other culinary purposes, and thus a convenient, healthful, and economical supply of heat and power may be delivered and utilized at a great distance from the generator without any appreciable loss from condensation or waste of water. The return-water may be admitted to the heater by means of automatic gravity-traps or feed-water apparatus in place of pumps, if desired.

It is evident that many more modifications of the various features and parts of this invention may be employed, which it is not deemed necessary here to enumerate.

My invention is not limited to the specific form of pressure-reducer or means for converting the hot water into steam shown and described; but any contruction which will operate to reduce the pressure and convert the hot water into steam may be employed without departing from the spirit of the invention.

Some of the parts which are herein shown and described are shown and more fully described in Patent No. 208,633, granted to me October 1, 1878, and form no part of the invention claimed herein, but are included in order to more fully and clearly illustrate the said invention.

Having now described the nature of the said invention and explained the manner of carrying it into practical effect, I hereby declare that what I consider to be novel and original, and therefore claim and desire to secure by Letters Patent of the United States, is—

1. In a system for supplying heat and power from a central station to large districts of buildings in which water is used as a heat-conveying medium, the combination of a heater, a supply-pipe leading from the heater to the building or buildings where heat or power is required and returning to the heater, a pressure-reducing valve, a radiator or other means by which the heat of the water is utilized, and a system of return-pipes by which the water is returned to the heater, substantially as shown and described.

2. In a hot-water and steam heat and power system, the combination of a heater, a supply-pipe leading from and returning to the heater, a pressure-reducing valve by which the hot water is converted into steam, a radiator or other means for utilizing the steam, a system of return-pipes by which the water of condensation is returned to the heater, and means for forcing a circulation in the supply-pipes, substantially as shown and described.

3. In a hot-water heating system, the combination of a heater, a supply-pipe leading from and returning to the heater, a force-pump or other means for causing a circulation in the supply-pipe, a circulating coil or radiator or other means for utilizing the heat of the water, and a system of return-pipes by which the water, after being circulated for heating purposes, is returned to the heater, substantially as shown and described.

4. The combination of a heater, a supply-pipe leading from and returning to the heater, a force-pump, a hot-water engine, pipes connecting the engine with the supply-pipe, a return-pipe, and pipes connecting the engine with the return-pipe, substantially as shown and described.

5. The combination of a heater, a supply-pipe leading from and returning to the heater, a force-pump, a return-pipe independent of the supply-pipe, and a preheater, as A, substantially as shown and described.

6. The combination of the water heater, a supply-pipe leading from and returning to the heater, a radiator or other means for utilizing the hot water, a discharge-water trap, and a system of return-pipes communicating with the trap and heater and radiator for reconveying the water to the heater.

7. The combination, with the separate supply and return pipes, of the tank V, provided with the partitions extending from the bottom upward to within a short distance of the top, and the trap U, constructed and operating substantially as shown and described.

8. The combination of the hot-water-supply pipe leading from and returning to the heater, the return-pipe, the radiators, and the differential discharge-water trap composed of the casings $B^3$, the diaphragm $B^2$, the stem $B^4$, the valve $B^5$, the barrel $B^6$, and pipes B, and the pipes $B^8$, $B^9$, $B^{10}$, and $B^{11}$, substantially as shown and described.

9. In a central-station heat and power system, whereby heat and power are furnished to large districts of buildings in cities and towns, the combination of a heater, a street supply-pipe leading from and returning to the heater, a force-pump, a street return-pipe communicating with the heater, branch pipes leading from the supply-pipe to the building where heat or power is required, branch return-pipes leading from the building and connecting with the street return-pipe, branch street supply and return pipes communicating with the main supply and return pipes, whereby the heating medium is circulated around the several blocks of the district, and means for controlling the flow in each and every section.

WM. E. PRALL.

Witnesses:
CHAS. A. CLEMENTS,
ROBERT JOHNSON.